Oct. 10, 1933.    L. D. GOFF    1,929,635
STEAM JOINT
Filed Jan. 15, 1932
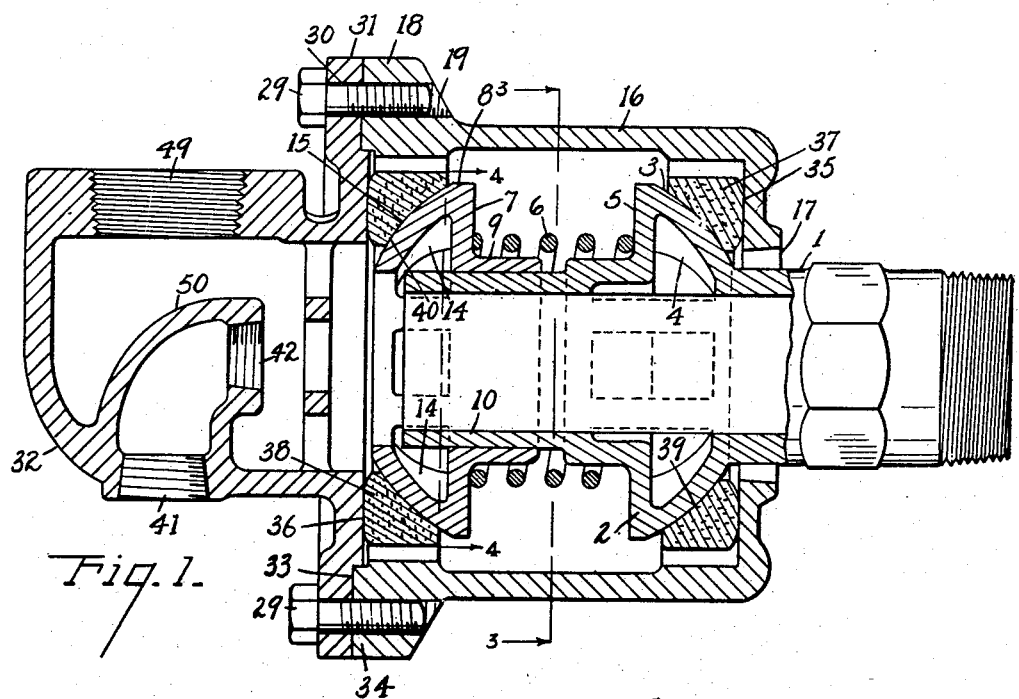
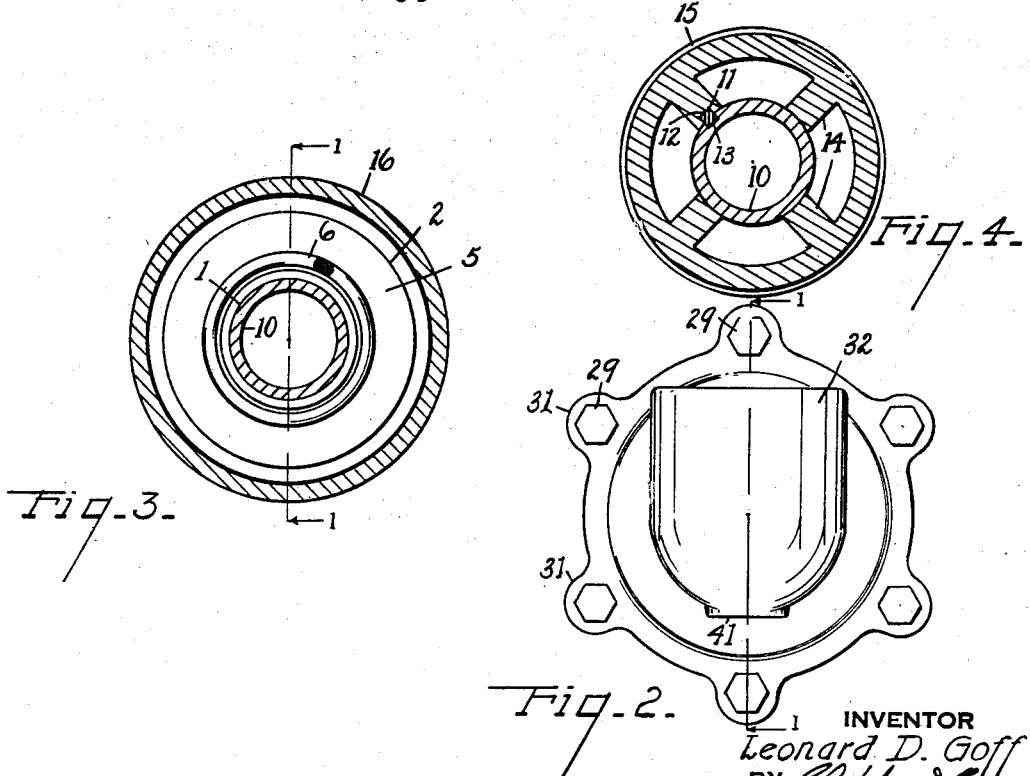
INVENTOR
Leonard D. Goff
BY
ATTORNEYS Patented Oct. 10, 1933

1,929,635

UNITED STATES PATENT OFFICE 1,929,635

STEAM JOINT

Leonard D. Goff, Three Rivers, Mich.

Application January 15, 1932. Serial No. 586,736

7 Claims. (Cl. 285—91)

This invention relates to improvements in revolving pressure joints.

The objects of the invention are:

First, to provide a simple and efficient joint of the class described in which the parts have great freedom of movement while they are at the same time spring pressed together.

Second, to provide a revolving pressure joint which is readily and effectively lubricated.

Objects pertaining to details and economies of construction and operation will appear from the description to follow. A preferred embodiment of my invention is illustrated in the accompanying drawing, in which:

Fig. 1 is an enlarged detail vertical central section through the joint taken on a line corresponding to line 1—1 of Figs. 2 and 3.

Fig. 2 is an end elevation.

Fig. 3 is a transverse vertical section taken on a line corresponding to line 3—3 of Fig. 1, and Fig. 4 is a fragmentary transverse vertical section taken on a line corresponding to line 4—4 of Fig. 1.

The parts are identified below by numerals of reference which are the same throughout the several views.

The tubular connecting member or nipple 1 is threaded for connection to a rotatable member (not shown) which may be the steam drum of a paper drier (not shown). The details of a connection between the tubular member 1 and the steam drum of a paper drier is disclosed in my copending application, Serial No. 503,959, filed December 22, 1930.

The tubular member 1 is adapted to rotate and is provided with an enlarged annular hollow integral shoulder 2 having a convex bearing surface 3 in the form of a spherical segment. The hollow interior of the shoulder 2 is provided with radial reinforcing ribs 4. The inner face 5 of the shoulder 2 is flat so as to constitute a seat for one end of the compression spring 6 that is seated on and bears against the inner face 7 of the integral hollow annular shoulder 8 provided on the sleeve 9 which is slidably but non-rotatably keyed to the reduced end 10 of the tubular member 1 by a key 11 disposed in opposed key ways 12 and 13 in the sleeve 9 and tubular member 1, respectively. The shoulder 8 is also provided with internal reinforcing ribs 14 and an outwardly facing convex bearing surface 15 in the form of a spherical segment. The convex bearing surface 3 of the shoulder 5 and the convex bearing surface 15 of the shoulder 7 preferably constitute segments of the same imaginary sphere so as to facilitate the flexing of the joint within the stationary casing or body 16.

The stationary casing 16 is of cup-like form having an opening 17 in the bottom thereof for the passage of the tubular member 1 and a flange 18 having threaded openings 19 therein for engagement by the attaching screws 29 extending through openings 30 in the flange 31 of the fixture 32. The flange 31 is provided with a recessed seat 33 for receiving the annular tongue 34 provided on the flange 18.

The opposed faces 35 and 36 on the bottom of the casing 16 and the flange 31 constitute supporting seats for the annular bearing rings 37 and 38 which are provided with concave bearing surfaces 39 and 40, respectively, in the form of spherical segments for coaction with the convex surfaces on the shoulders 2 and 8. The compression spring 6 resiliently urges the convex bearing surfaces on the shoulders into bearing engagement with the concave surfaces in the bearing rings.

It will be noted by reference to the drawing that the sealing rings 37 and 38 are smaller in diameter than the body 16 in which they are disposed. This permits the nipple 1 to have a lateral movement relative to the body 16, the sealing rings being free to slide on their seats until limited by the inside of the body.

In operation, the shoulders 2 and 8 rotate with the tubular connecting member 1 in the bearing rings 37 and 38. Inasmuch as the bearing surfaces between the shoulders and the bearing rings constitute portions of the same imaginary sphere, the tubular member 1 is free to flex through a relatively wide arc without affecting the seal of the joint. The tubular member is also free to flex laterally as pointed out above.

The fitting 32 is tapped at 49 to receive a steam supply pipe (not shown) and is also provided with an internal conduit housing 50 of elbow shape having a tap 41 to receive a drain pipe (not shown). The elbow 50 is also provided with a tap 42 for receiving that portion of the drain pipe (not shown) which extends through the center of the tubular member 1 and extends down into the drum.

The fitting or head 32 is shown and described by way of example as one type of fitting which is applicable to the device. The joint is adapted for use with other types of heads, including one with a plain boss, where the joint is used for flow in one direction, as in rotating cylinders through which refrigerated brine is passed, the flow being through a joint into one end of the cylinder and out through a joint at the other end.

The bearing rings 37 and 38 may be made of any suitable lubricated metallic packing material or of graphite or bronze or any other self-lubricating material. The joint provides a highly effective and efficient seal and is also quite flexible and substantially universal in its action.

It is obvious that various changes and modifications may be made in the details of construction and design of the above specifically described embodiments of my invention without departing from the spirit thereof, such changes and modifications being restricted only by the scope of the following claims.

Having thus described my invention, what I claim as new and desire to secure by Letters Patent is:

1. In a joint of the class described, the combination with a rotatable tubular connecting member having an integral annular hollow shoulder provided with a convex bearing surface, of a sleeve keyed to said member for slidable but non-rotatable movement thereon and having an integral annular hollow shoulder provided with a convex bearing surface, a compression spring on said sleeve and member resiliently biasing said convex bearing surfaces apart, a stationary casing having internal annular flat end seats, and annular bearing rings slidably abutting said end seats and having concave bearing surfaces coacting with said convex bearing surfaces.

2. In a joint of the class described, the combination with a tubular connecting member having an annular hollow shoulder provided with a convex bearing surface, of a sleeve keyed to said member for slidable but non-rotatable movement thereon and having an annular hollow shoulder provided with a convex bearing surface, spring means resiliently biasing said convex bearing surfaces apart, a casing having internal annular flat end seats, and annular bearing rings abutting said end seats and having concave bearing surfaces coacting with said convex bearing surfaces.

3. In a joint of the class described, the combination with a rotatable tubular member having spaced shoulders thereon slidable but non-rotatable relative to each other, of means biasing said shoulders apart, said shoulders having outwardly facing convex bearing surfaces in the form of spherical segments, bearing rings having inwardly facing concave bearing surfaces in the form of spherical segments directly coacting with said convex bearing surfaces, and a casing having annular flat seats for said bearing rings.

4. In a joint of the class described, the combination with a rotatable tubular member having spaced shoulders thereon slidable but non-rotatable relative to each other, of means biasing said shoulders apart, said shoulders having convex bearing surfaces in the form of spherical segments, bearing rings having concave bearing surfaces in the form of spherical segments directly coacting with said convex bearing surfaces, and a casing having seats for said bearing rings to slidably engage.

5. In a joint of the class described, the combination with a tubular member having spaced shoulders thereon slidable but non-rotatable relative to each other, of means biasing said shoulders apart, said shoulders having convex bearing surfaces in the form of spherical segments, bearing rings having concave bearing surfaces in the form of spherical segments coacting with said convex bearing surfaces, and seats for said bearing rings to slidably engage.

6. In a joint of the class described, the combination with a stationary casing having opposed bearing ring seats, and bearing rings slidably seated thereon having concave bearing surfaces in the form of spherical segments, of a rotatable tubular member extending into said casing and having spaced shoulders provided with convex bearing surfaces in the form of spherical segments coacting with said concave bearing surfaces, said shoulders being movable relative to each other longitudinally of said tubular member, and means resiliently urging said shoulders into bearing engagement with said rings.

7. In a joint of the class described, the combination with a casing having opposed relatively large bearing ring seats, and relatively small bearing rings slidably seated thereon for transverse movement and having concave bearing surfaces in the form of spherical segments, of a tubular member extending into said casing and having spaced shoulders provided with convex bearing surfaces in the form of spherical segments coacting with said concave bearing surfaces.

LEONARD D. GOFF.